United States Patent [19]
Åhs

[11] Patent Number: 5,804,933
[45] Date of Patent: Sep. 8, 1998

[54] METHOD FOR OPERATING AN ADJUSTING APPARATUS AND MEANS FOR ADJUSTING A POSITIONAL DEVICE

[75] Inventor: Wilgot Åhs, Koppom, Sweden

[73] Assignee: SEM AB, Åmål, Sweden

[21] Appl. No.: 750,323

[22] PCT Filed: May 30, 1995

[86] PCT No.: PCT/SE95/00613

§ 371 Date: Nov. 26, 1996

§ 102(e) Date: Nov. 26, 1996

[87] PCT Pub. No.: WO95/34118

PCT Pub. Date: Dec. 14, 1995

[30] Foreign Application Priority Data

Jun. 3, 1994 [SE] Sweden .................................. 9401923

[51] Int. Cl.$^6$ .................................................. H02K 33/00
[52] U.S. Cl. .............................. 318/45; 318/37; 318/102; 318/119; 318/128; 310/36; 310/37
[58] Field of Search ..................................... 318/109–120, 318/560, 561, 128, 138; 310/184, 268, 36, 37

[56] References Cited

U.S. PATENT DOCUMENTS

| | | |
|---|---|---|
| 1,860,492 | 5/1932 | Butler . |
| 3,530,346 | 9/1970 | Mariani . |
| 4,554,490 | 11/1985 | Scott . |

FOREIGN PATENT DOCUMENTS

| | | |
|---|---|---|
| 349678 | 3/1922 | Germany . |
| 469393 | 1/1968 | Switzerland . |

*Primary Examiner*—Paul Ip
*Attorney, Agent, or Firm*—Collard & Roe, P.C.

[57] ABSTRACT

A method and apparatus for operating a positioning device for an adjustable device. The positioning device is mechanically actuated by a bearing connected to a pivotable armature that interacts magnetically with an electromagnet. The electromagnet is energized by current pulses generated by a computer program. The current pulses cause the air gap between the pivotable armature and the electromagnet to vary between open positions where the electromagnet is not magnetized, and a closed position where the electromagnet is magnetized. Several bearings and associated electromagnets may be arranged to operate the positioning device in one or more directions and at different torques and operating speeds for different directions of operation and different positions of adjustment.

8 Claims, 2 Drawing Sheets

METHOD FOR OPERATING AN ADJUSTING APPARATUS AND MEANS FOR ADJUSTING A POSITIONAL DEVICE

This is application is a 371 of PCT/SE95/00613 filed on May 30, 1995.

TECHNICAL FIELD

The present invention relates to a method of operating at least one adjusting/positioning apparatus for an adjustable device, means of operating an adjustable device and an application of the said means.

STATE OF THE ART

The use of rapid pulses to drive a motor shaft through an electromagnetically vibrated (oscillating) arm mounted on the shaft has long been known. The shaft may be driven reversibly by an arrangement of two electromagnetically vibrated arms (see U.S. Pat. No. 1,860,492 and DE-C-349 678).

The use of a ratchet connected to a solenoid or electromagnet energized by an alternating current as a stepping drive for a disc device is also known (see U.S. Pat. No. 3,530,346 and CH-C-469 393).

The control of a feeder for handling vibrating material is known from U.S. Pat. No. 4,554,490. An optimum speed for conveying material so as to improve the feeding efficiency, reduce noise levels and reduce mechanical wear and tear on the equipment can be achieved by varying strokes and driving frequencies.

A disadvantage of known devices which use pulse-controlled electromagnets is that they use rapid oscillating pulses, a method which is not always suitable for operating adjustable devices, in addition to which the pulse length, frequency and amplitude cannot be varied at different times and at different positions of adjustment.

SUMMARY OF INVENTION

The present invention relates to a method and means of using at least one tool to operate an adjusting/positioning apparatus for an adjustable device, the tool being actuated mechanically by a moving element interacting magnetically with an electromagnet.

The electromagnet is energized by current pulses controlled by a computer program, the moving element actuating the tool operating adjusting/positioning apparatus in response to the current pulses in order to operate the adjustable device in accordance with the computer program. Several tools may be connected to the adjusting/positioning apparatus separately and/or in series and/or in parallel to operate the adjusting/positioning apparatus in one or the other direction at the specified torque/operating speed for different directions of operation and/or at different positions of adjustment.

The mutually dependent or independent current pulses for the electromagnets in question may be of a fixed or variable frequency, and the moving elements in question may be controlled to assume air gaps of different sizes with respect to the electromagnet under the control of the computer program.

In one embodiment of the invention, the adjusting apparatus consists of a threaded shaft provided with a fastener, such as a nut, to secure the adjusting apparatus to the adjustable device. The tool for operating the adjustable device may consist of an actuating/ratchet device.

The invention relates particularly to the use of the means of operating or positioning one or more adjustable devices in a vehicle, preferably using a single computer to control all of the magnetizing pulses.

Other special features and characteristics are described in the appended patent claims.

The invention is particularly applicable as a small, powerful, slow-acting motor, such as a linear motor, angle motor, stepping motor or suchlike, or as an actuator for operating and adjusting a device, such as turning a shaft, in instances in which solenoids are too fast-acting.

An advantage of the method and means in accordance with the invention, compared with other known adjusting devices, is the wide range of adjustment facilities, in terms of torque and speed of operation, available for different directions of operation, as well as for different adjustment times and positions. This is due to the computer control of the induced magnetizations of the electromagnets, which are determined by several parameters, such as current pulse frequency, pulse amplitude and pulse length, and by the nature of the mutual dependency between the magnetization pulses.

Another advantage is the simple compact construction as well as the reliability of the means in accordance with the invention, which is intended primarily to replace devices, such as servomotors, which are often used with adjustable devices, for example, for window regulators, seats and rear view mirrors in vehicles.

The electromagnet with moving element in accordance with the invention differs from conventional electromagnets with two positions, an open, maximized position and a closed (attracted) position. Thus, for example, the invention makes it possible to choose continuously from a maximum operating speed and the associated minimum torque, to a minimum operating speed and the associated maximum torque. As a further advantage, the invention makes it possible, when positioning, to operate the adjustable device at maximum force and low operating speed initially, then to reduce the force and increase the speed, while using another, optional operating speed/force in the other direction.

DESCRIPTION OF AN EMBODIMENT OF THE INVENTION

The invention will be described in detail below with reference to the appended drawings, of which FIG. 1 is a schematic view of a means of operating an adjustable device in accordance with the invention;

Figure 1:
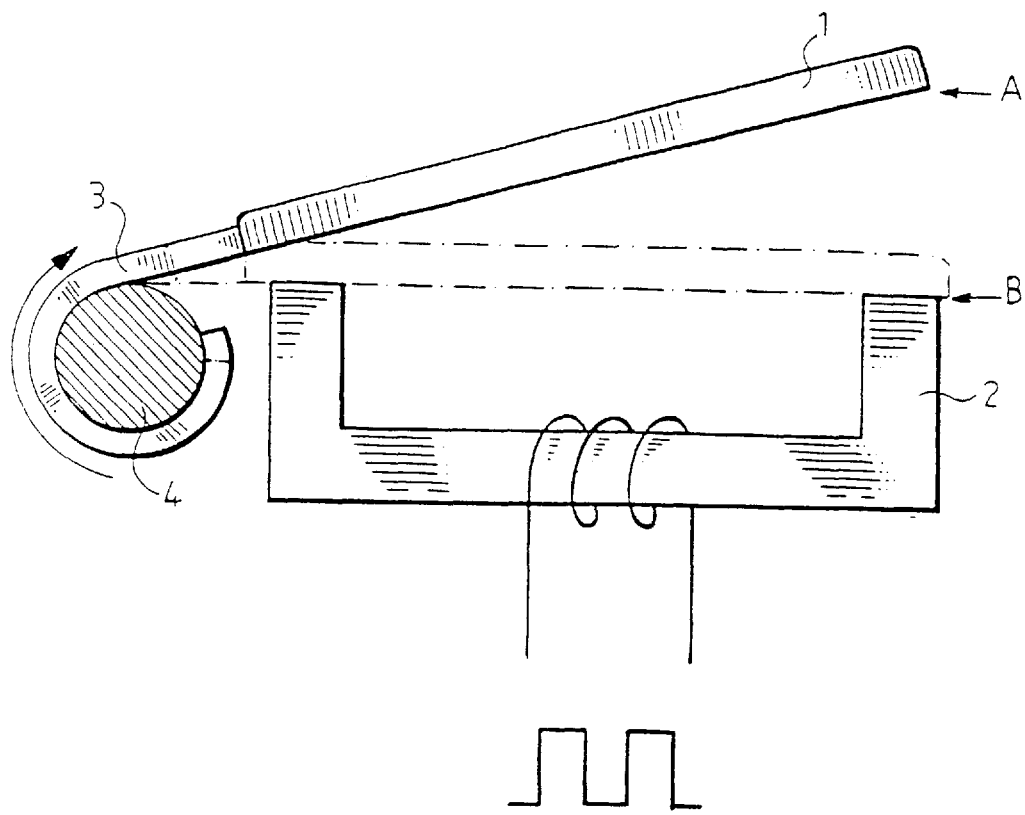

FIG. 1 shows a moving element 1 made of a magnetic material, which element interacts with an electromagnet 2, the winding of which is supplied with an alternating current. In the embodiment shown, the moving element 1 consists of a pivoted armature, the free end of which can assume a closed position B when the electromagnet is energized by a current, and positions A when the electromagnet is not energized i.e. when no current is flowing in the winding. Positions A are all positions which may be assumed by the moving element 1 when the electromagnet is not energized.

The moving element may assume a maximum distance from the electromagnet, with or without the provision of a stop (not shown), while the moving element 1 may move between positions A and position B in step with the current pulses supplied to the electromagnet 2. The moving element 1 and interacting electromagnet 2 may, naturally, be of another optional design, for example a push/pull magnet, suitable for a specific purpose.

Furthermore, the invention may be provided with optional devices (not shown) to pull the moving element 1 into the maximum open position, and to retain it in that position, when the electromagnet 2 is not energized.

In the example shown in FIG. 1, the other end of the moving element 1 mechanically actuates a tool 3 which, in turn, operates an adjusting apparatus 4. The tool 3 may be of an appropriate type, preferably a journalled ratchet, although all types of tractive/ratchet devices, such as a strap, or other bearing arrrangements, may, naturally, also be used.

In the embodiment shown in FIG. 1, the adjusting apparatus 4 consists of a threaded shaft attached to the adjustable device (not shown) by means of a fastener, such as a nut. The shaft is turned in the direction indicated by the arrow.

Figure 2:
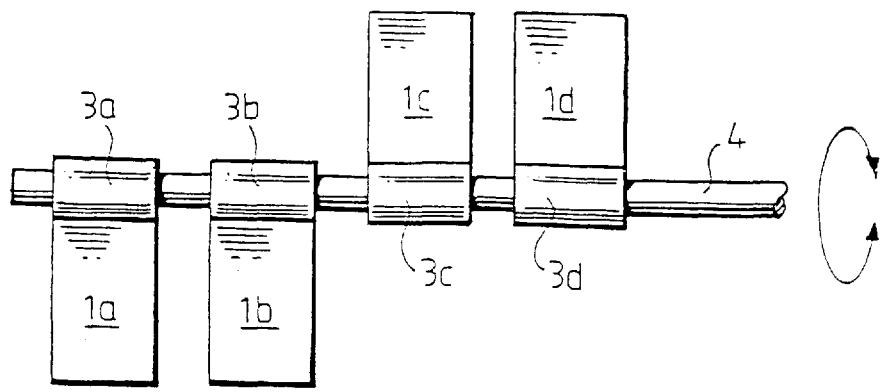
FIG. 2 is a schematic illustration of an adjusting apparatus driven by several electromagnetically operated actuating/ratchet devices.

FIG. 2 illustrates schematically how moving parts 1a, 1b, 1c and 1d may be arranged to actuate corresponding tools 3a, 3b, 3c and 3d, to drive (and lock) the shaft 4 in two different directions, the tools 3a and 3b being arranged to drive the shaft clockwise and the tools 3c and 3d to drive it counterclockwise.

Other types of adjusting apparatus, such as discs, wheels, drums, plates, rods aligned in various directions, and so on, may, naturally, also be used to position/adjust the shaft in one or more dimensions.

Figure 3:
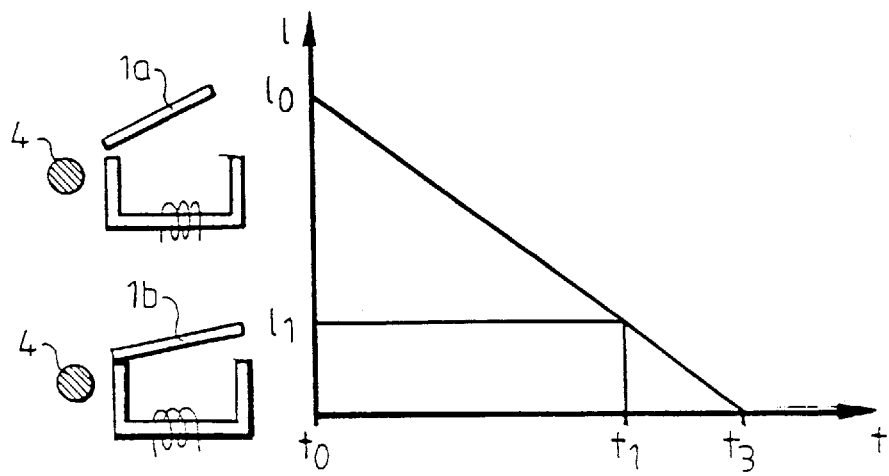
FIG. 3 is a diagram showing the size of the air gap as a function of time.

FIG. 3 exemplifies the operation of a shaft 4 by moving parts 1a and 1b in combination, in which, at time $t_0$, the moving part 1a starts to drive the shaft 4, through tool 3 (not shown), at a low force (large air gap $l_0$) and, at time $t_1$, receives assistance from the moving part 1b to drive the shaft at a higher force (smaller air gap $l_1$), until the moving parts 1a and 1b reach the closed position B at time $t_3$.

It will be seen that a device may be operated in an almost unlimited number of ways by varying different parameters, such as the current/pulse frequency, pulse amplitude and pul length, the possible distance between the moving element and the electromagnet, the position and design of the particular moving element/adjusting apparatus, the nature of the electromagnet and winding, the directions of action, and so on.

According to the invention, the frequency, number and magnitude of the current pulses are determined by the program in a computer (not shown in FIG. 1) connected to the winding of the electromagnet 2. Magnetization of the various electromagnets i.e. the order in which they are connected, whether they should be connected in series or parallel or energized individually, or whether they should be mutually energized by dependent or independent current pulses, is controlled by the computer program which, as a result, can provide different operating characteristics for different directions and at different positions of adjustment, and can determine the torque as a function of the air gap. The magnitude of the operating movement achieved by the tool (3) as the moving element switches from the open position A to the closed (attracted) position B is dependent on the size of the air gap which, in turn, is a function of the time during which the electromagnet is not energized.

Figure 4A:
FIG. 4 is a diagram illustrating the relationship between torque and operating speed at a specified frequency and amplitude.
Figure 4B:

It will be seen from FIG. 4, together with FIG. 3, that if the current is zero for a longer period (see FIG. 4), the moving, unmagnetized part (1a) will have time to be pulled to have a larger air gap relative to the electromagnet (2), with the result that the shaft 4 will pivoted through a greater distance, at a correspondingly lower torque, in response to the next current pulse while, if the current is zero for a short period (see FIG. 4b), the moving, unmagnetized part (1b) will have insufficient time to move any considerable distance from the closed (attracted) position B and the shaft (4) will only pivot through a short distance in response to the next current pulse, although at a correspondingly higher torque. Specifying the length of the current pulse, at a given frequency and amplitude, affords the option of operating the shaft at high force and low operating speed, or in some other manner.

The means of operating devices may be used to advantage to adjust/operate various devices in a vehicle, such as the window regulators, rear view mirrors, seats, boot lid, doors, (central) locks, sunroof, filler cap, air dampers, and so on, each of which, in addition to operating devices of different kinds, requires a different method of operation in terms of force, speed etc.

A single on-board computer may be programmed to control the current pulses for the various adjustable devices, to ensure optimum adjustment of the devices. Since programming of the computer to perform the various operations is state of the art, it is not dealt with in this description of the invention.

I claim:

1. A method of operating a positioning apparatus for an adjustable device connected to bearings arranged individually, or connected to each other in series or in parallel, comprising:

connecting each bearing to a pivotable armature, said pivotable armature interacting magnetically with an electromagnet;

generating current pulses in the electromagnet with a computer program;

mechanically actuating the bearings by selectively magnetizing the electromagnet with the current pulses to vary the size of the air gap between the pivotable armature and the electromagnet, thereby alternating the pivotable armature between open positions where the electromagnet is not energized and a closed position when the electromagnet is energized, wherein the current pulses control the directions of operation and positions of the positioning apparatus as well the torque and speed of the bearings.

2. The method according to claim 1, wherein the positioning apparatus is operated in one direction by at least one bearing and in another direction by at least one bearing.

3. The method according to claim 4, wherein the current pulses have variations in frequency and amplitude.

4. The method according to claim 3, wherein the current pulses are selected from the group consisting of fixed frequency pulses and variable frequency pulses.

5. The method according to claim 4, wherein the torque and operating speed of the bearings actuating the positioning apparatus are controlled by specifying the frequency and amplitude of the current pulses controlling the air gap.

6. A positioning apparatus for operating an adjustable device, comprising:

a positioning device;

a plurality of bearings arranged for actuating the positioning device;

a pivotable armature connected to each bearing;

an electromagnet magnetically connected to each pivotable armature; and a computer adapted to generate current pulses in the electromagnet and thereby control the position and direction of operation of the positioning device, wherein the current pulses cause said pivotable armature to alternate between open non-magnetized positions with air gaps of varying sizes with respect to the electromagnet, and a closed position, to vary the torque and speed of the respective bearing.

7. The apparatus according to claim 6, wherein at least one bearing operates the positioning device in one direction and at least one bearing operates the positioning device in another direction by means of different current pulses, said pulses being selected from the group of fixed frequency pulses and variable frequency pulses.

8. The apparatus according to claim 6, wherein the positioning device comprises a threaded shaft and a fastener for securing the shaft to the adjustable device.

* * * * *